(12) United States Patent
Owen

(10) Patent No.: US 9,212,677 B2
(45) Date of Patent: Dec. 15, 2015

(54) BLIND HOLE ANCHOR, CABLE TIE AND METHOD OF SECURING AN ANCHOR IN A BLIND HOLE

(76) Inventor: Thomas Dale Owen, Braselton, GA (US)

( * ) Notice: Subject to any disclaimer, the term of this patent is extended or adjusted under 35 U.S.C. 154(b) by 672 days.

(21) Appl. No.: 13/470,596

(22) Filed: May 14, 2012

(65) Prior Publication Data

US 2013/0298381 A1 Nov. 14, 2013

(51) Int. Cl.
| | | |
|---|---|---|
| *A41F 1/00* | (2006.01) | |
| *F16B 13/08* | (2006.01) | |
| *B65D 63/10* | (2006.01) | |
| *F16L 3/233* | (2006.01) | |
| *H02G 3/32* | (2006.01) | |

(52) U.S. Cl.
CPC ........ *F16B 13/0808* (2013.01); *B65D 63/1027* (2013.01); *F16L 3/2332* (2013.01); *H02G 3/32* (2013.01); *Y10T 29/49826* (2015.01); *Y10T 29/49947* (2015.01)

(58) Field of Classification Search
CPC ... F16B 13/0808; F16B 19/1045; F16L 3/233
USPC ................................. 24/458, 453; 411/34, 38
See application file for complete search history.

(56) References Cited

U.S. PATENT DOCUMENTS

| | | | |
|---|---|---|---|
| 780,960 A | 1/1905 | Palmer | |
| 2,262,840 A | 11/1941 | Gibson et al. | |
| 2,937,834 A | 5/1960 | Orenick et al. | |
| 3,054,585 A | 9/1962 | Roberts et al. | |
| 3,465,992 A | 9/1969 | Schuplin | |
| 3,605,199 A | 9/1971 | Eberhardt | |
| 3,766,608 A | 10/1973 | Fay | |
| 3,860,997 A | 1/1975 | Van Riper, Jr. et al. | |
| 3,886,630 A | 6/1975 | Emery | |
| 3,983,603 A | 10/1976 | Joyce | |
| 4,185,800 A | 1/1980 | Kabel | |
| 4,272,047 A | 6/1981 | Botka | |
| 4,447,934 A | 5/1984 | Anscher | |
| 4,498,507 A | 2/1985 | Thompson | |
| 4,543,691 A | 10/1985 | Calmettes | |
| 4,557,455 A | 12/1985 | Benjamin | |
| 4,680,834 A | 7/1987 | Andre et al. | |
| 4,788,751 A | 12/1988 | Shely et al. | |
| 4,805,856 A | 2/1989 | Nicoli et al. | |
| 4,862,561 A | 9/1989 | Lichtenberg | |
| 4,865,501 A * | 9/1989 | Ferris .............................. | 411/340 |
| 4,866,816 A | 9/1989 | Caveney | |
| 4,882,813 A | 11/1989 | Nakamura | |
| 4,944,475 A * | 7/1990 | Ono et al. ........................ | 248/71 |

(Continued)

*Primary Examiner* — Robert J Sandy
*Assistant Examiner* — Matthew Sullivan
(74) *Attorney, Agent, or Firm* — Mathew L. Grell; Balser & Grell IP Law

(57) ABSTRACT

An anchor, cable tie combination having a barrel with slatted sections for insertion into the hole, a flange positioned on a first rearward end of the barrel for setting the depth the barrel may be inserted into the hole, at least one locking buckle positioned approximate the flange having a channel and a locking pawl located within the locking buckle, an elongated strap having a stopper positioned on a first end of the strap, and wherein one or more cross-bars are formed crosswise on the strap and, wherein the second end of the strap is inserted through the second forward end of the barrel, the first rearward end of the barrel, the flange and the channel of the locking buckle, wherein the locking pawl of the channel engages the cross-bars formed on the strap, until the stopper of the strap contacts a second forward end of the barrel.

31 Claims, 13 Drawing Sheets

(56) References Cited

U.S. PATENT DOCUMENTS

| | | | |
|---|---|---|---|
| 4,993,669 A | 2/1991 | Dyer | |
| 5,006,027 A * | 4/1991 | Smith | 411/522 |
| 5,121,524 A | 6/1992 | Mortensen | |
| 5,224,244 A | 7/1993 | Ikeda et al. | |
| 5,636,486 A * | 6/1997 | Hall | 52/383 |
| 5,690,454 A * | 11/1997 | Smith | 411/30 |
| 5,743,061 A | 4/1998 | Rolph | |
| 5,836,053 A | 11/1998 | Davignon et al. | |
| 5,921,510 A * | 7/1999 | Benoit et al. | 248/71 |
| D419,861 S | 2/2000 | Khokhar | |
| 6,076,234 A | 6/2000 | Khokhar et al. | |
| 6,161,999 A | 12/2000 | Kaye et al. | |
| 6,185,791 B1 | 2/2001 | Khokhar | |
| 6,226,839 B1 | 5/2001 | Sayegh | |
| 6,532,631 B2 | 3/2003 | Rohaly et al. | |
| 6,550,723 B2 | 4/2003 | Fraley, II et al. | |
| 6,928,701 B2 | 8/2005 | Hutter, III | |
| 7,258,316 B2 | 8/2007 | Reeves | |
| 7,887,273 B2 * | 2/2011 | Vigliotti et al. | 411/38 |
| 7,954,300 B1 * | 6/2011 | Kufner et al. | 52/749.11 |
| 8,079,199 B1 * | 12/2011 | Kufner et al. | 52/749.11 |
| 2003/0070263 A1 | 4/2003 | Mohnke | |
| 2004/0231110 A1 | 11/2004 | Hutter, III | |
| 2006/0182511 A1 * | 8/2006 | Dessureau | 411/38 |
| 2007/0205335 A1 | 9/2007 | Huebner et al. | |
| 2008/0250609 A1 * | 10/2008 | Franks | 24/16 R |
| 2009/0056267 A1 | 3/2009 | Reeves | |
| 2010/0263304 A1 * | 10/2010 | Torrents I Comas | 52/126.5 |

* cited by examiner

BLIND HOLE ANCHOR, CABLE TIE AND METHOD OF SECURING AN ANCHOR IN A BLIND HOLE

TECHNICAL FIELD

The disclosure generally relates to an anchor, more specifically, it is related to an anchor or fastener for blind hole applications or connecting two parts with holes.

BACKGROUND

A variety of hollow wall or hole anchors are well known in the art and are used in a variety of applications, such as securing a picture frame hook to a hollow wall or other hole in a given material or affixing two or more holed items or objects together. For example, fasteners may be in the shape of a pine-tree or a Christmas tree which are sized and shaped to fit in an aperture in a mounting surface. Moreover, various hardware such as a nut and bolt or flanged or winged hollow wall anchors are available, and in use such fasteners are inserted into a hole or aperture to expand by a screw type device forcing the behind the wall portion to expand or flair with each rotation of the screw until frictionally anchored in the hole.

In addition, cable ties are well known in the art and are used in a variety of applications, such as, securing a cable to a mounting structure. Cable ties include an elongated strap and a locking head integrally connected to one end of the strap. In use, the free end of the strap is inserted into a channel in the locking head to form a loop around the cable(s), wherein increased insertion of the free end of the strap into the locking head decreases the size of the loop. The cable tie is locked into place around the cable by a locking tang or pawl located within the locking head which engages teeth or cross-bars formed on the strap. Another example is a locking push mount cable ties having pine-tree or a Christmas tree or square lock that may be pushed into a pre-formed matching hole in combination with a cable tie.

One problem with pine-tree, square lock shaped and nut and bolt or flanged or winged hollow wall anchors of the type described above is that such anchors and fasteners are adapted to be inserted through apertures of a particularly narrow range. In particular, if the diameter of the aperture in the mounting surface is slightly larger than the diameter of the anchor or fastener, the anchor or fastener may be unusable. In addition, when an anchor or fastener is utilized with a cable tie, such two part devices do not cross integrate any of the components between the two parts in an effort to reduce the part count.

Therefore, it is readily apparent that there is a recognizable unmet need for a blind hole anchor, cable tie combination and method of securing that functions to mechanically anchor the apparatus in a variety of hole sizes, provide a combination anchor and cable tie with reduced parts and, thereby, secure the anchor without the need for any tools other than a scissor, knife or box cutter.

SUMMARY

Briefly described, in an example embodiment, the present apparatus and method overcomes the above-mentioned disadvantages and meets the recognized need for a blind hole anchor, cable tie combination and method of securing comprising, in general, a tube shaped barrel having slits or slatted sections for insertion into the hole, a washer shaped flange positioned on a first rearward end of the barrel for setting the depth the barrel may be inserted into the hole, at least one locking buckle positioned approximate the flange or formed as a combination flange positioned on the first end of the barrel having a channel and a locking tang or pawl located within the locking buckle, an elongated strap having a stopper positioned on a first end of the strap, and wherein one or more teeth or cross-bars are formed crosswise on the strap and, wherein the second end of the strap is inserted through the second forward end of the barrel, the first rearward end of the barrel, the flange and the channel of the locking buckle, wherein the locking tang or pawl of the channel engages the teeth or cross-bars formed on the strap, until the stopper of the strap contacts a second forward end of the barrel.

In use, the tube shaped barrel having slits or slatted sections is inserted into the hole or blind hole until the washer shaped flange seats against the hole's surface, the elongated strap is pulled through the locking buckle, wherein the locking tang or pawl of the channel engages the teeth or cross-bars formed on the strap causing the slits or slatted sections of the barrel to expand, bend, twist or mushroom out gripping the hole or backside of a hollow wall or object, and thus the strap locks in the locking buckle securing the anchor in the hole.

According to its major aspects and broadly stated, the present apparatus meets the recognized need for a blind hole anchor, cable tie combination and method of securing including an anchor for insertion into an aperture of an object to anchor therein including: a barrel, having a first barrel end and a second barrel end, formed with one or more slatted sections traverse approximately from said first barrel end to said second barrel end; a flange positioned approximate said first barrel end configured to set the depth said barrel inserted into the aperture; at least one locking buckle positioned approximate said first barrel end and configured with a channel therethrough; a pawl positioned within said locking buckle adjacent said channel; and an elongated strap configured with a first strap end and a second strap end, said strap configured with a stopper positioned on a first strap end, and said strap configured with one or more cross-bars formed on said strap.

In a further exemplary embodiment, a blind hole anchor, cable tie combination and method of securing including an anchor for insertion into an aperture of an object to anchor therein including: a barrel, having a first barrel end and a second barrel end, formed with one or more slatted sections traverse approximately from said first barrel end to said second barrel end; a flange positioned approximate said first barrel end configured to set the depth said barrel inserted into the aperture; a first locking buckle positioned approximate said first barrel end and configured with a first buckle channel therethrough; a first buckle pawl positioned within said first locking buckle adjacent said channel; an elongated strap configured with a first strap end and a second strap end, said strap configured with a stopper positioned on a first strap end, and said strap configured with one or more cross-bars formed on said strap; a second locking buckle positioned approximate said first barrel end and configured with a second buckle channel therethrough; and a second buckle pawl positioned within said second buckle adjacent said channel.

In a further exemplary embodiment of a method of securing of a blind hole anchor, cable tie combination including the steps of providing an anchor including a barrel, having a first barrel end and a second barrel end, formed with one or more slatted sections traverse approximately from said first barrel end to said second barrel end, a flange positioned approximate said first barrel end configured to set the depth said barrel inserted into the aperture, at least one locking buckle positioned approximate said first barrel end and configured with a channel therethrough, a pawl positioned within said locking buckle adjacent said channel, and an elongated strap configured with a first strap end and a second strap end, said strap configured with a stopper positioned on a first strap end, and said strap configured with one or more cross-bars formed on said strap; positioning said second barrel end in the aperture; inserting said barrel into the aperture until said flange seats against the object; pulling said elongated strap through said channel; ratcheting said one or more cross-bars formed on said strap across said pawl; compressing said one or more slatted sections between said first barrel end and said second barrel end; and locking the object between said flange and said compressed said one or more slatted sections.

In a further exemplary embodiment of a method of securing of a blind hole anchor, cable tie combination including the steps of providing an anchor including a barrel, having a first barrel end and a second barrel end, formed with one or more slatted sections traverse approximately from said first barrel end to said second barrel end, a flange positioned approximate said first barrel end configured to set the depth said barrel inserted into the aperture, a first locking buckle positioned approximate said first barrel end and configured with a first buckle channel therethrough, a first buckle pawl positioned within said first locking buckle adjacent said channel, an elongated strap configured with a first strap end and a second strap end, said strap configured with a stopper positioned on a first strap end, and said strap configured with one or more cross-bars formed on said strap, a second locking buckle positioned approximate said first barrel end and configured with a second buckle channel therethrough, and a second buckle pawl positioned within said second buckle adjacent said channel; positioning said second barrel end in the aperture; inserting said barrel into the aperture until said flange seats against the object; pulling said elongated strap through said first buckle channel; ratcheting said one or more cross-bars formed on said strap across said first buckle pawl; compressing said one or more slatted sections between said first barrel end and said second barrel end; and locking the object between said flange and said compressed said one or more slatted sections.

Accordingly, a feature of the a blind hole anchor, cable tie combination and method of securing is its ability to anchor or fasten in an aperture, hole or blind hole.

Another feature of the a blind hole anchor, cable tie combination and method of securing is its ability to grip the hole or backside of a hollow wall.

Yet another feature of the blind hole anchor, cable tie combination and method of securing is its ability to provide a new and improved cable tie.

Yet another feature of the blind hole anchor, cable tie combination and method of securing is its ability to provide a combination anchor and cable tie to secure a cable to a mounting surface.

Yet another feature of the blind hole anchor, cable tie combination and method of securing is its ability to provide a cable tie which includes an anchor which can be inserted into an aperture in the mounting surface.

Yet another feature of the blind hole anchor, cable tie combination and method of securing is its ability to provide an anchor that begins generally in the shape of a tube or barrel.

Yet another feature of the blind hole anchor, cable tie combination and method of securing is its ability to provide an anchor which can be inserted into or through a large range of aperture sizes and anchor or fasten to the same.

Yet another feature of the blind hole anchor, cable tie combination and method of securing is its ability to provide low insertion force to insert the anchor or fastener through the aperture of the mounting surface.

Yet another feature of the blind hole anchor, cable tie combination and method of securing is its ability to provide an anchor integrated with a cable tie.

Yet another feature of the blind hole anchor, cable tie combination and method of securing is its ability to provide a cable tie to bind a bundle of wires or cables and the like.

Yet another feature of the blind hole anchor, cable tie combination and method of securing is its ability to provide ease of handling for sufficiently fastening the anchor and fastening the bundle of wires in the cable tie.

Yet another feature of the blind hole anchor, cable tie combination and method of securing is its ability to provide a cable tie integrated with an anchor, which comprises a strap member to be looped around a wire or cable bundle and a second buckle member connected to the flange.

These and other features of the lap blind hole anchor, cable tie combination and method of securing will become more apparent to one skilled in the art from the following Brief Description of the Drawings, Detailed Drawings, Detailed Description and Claims when read in light of the accompanying drawings.

BRIEF DESCRIPTION OF THE DRAWINGS

The present blind hole anchor, cable tie combination and method of securing or the like will be better understood by reading the Detailed Description of the embodiments with reference to the accompanying drawings, in which like reference to numerals denote similar structures and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1-13 specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Figure 1:
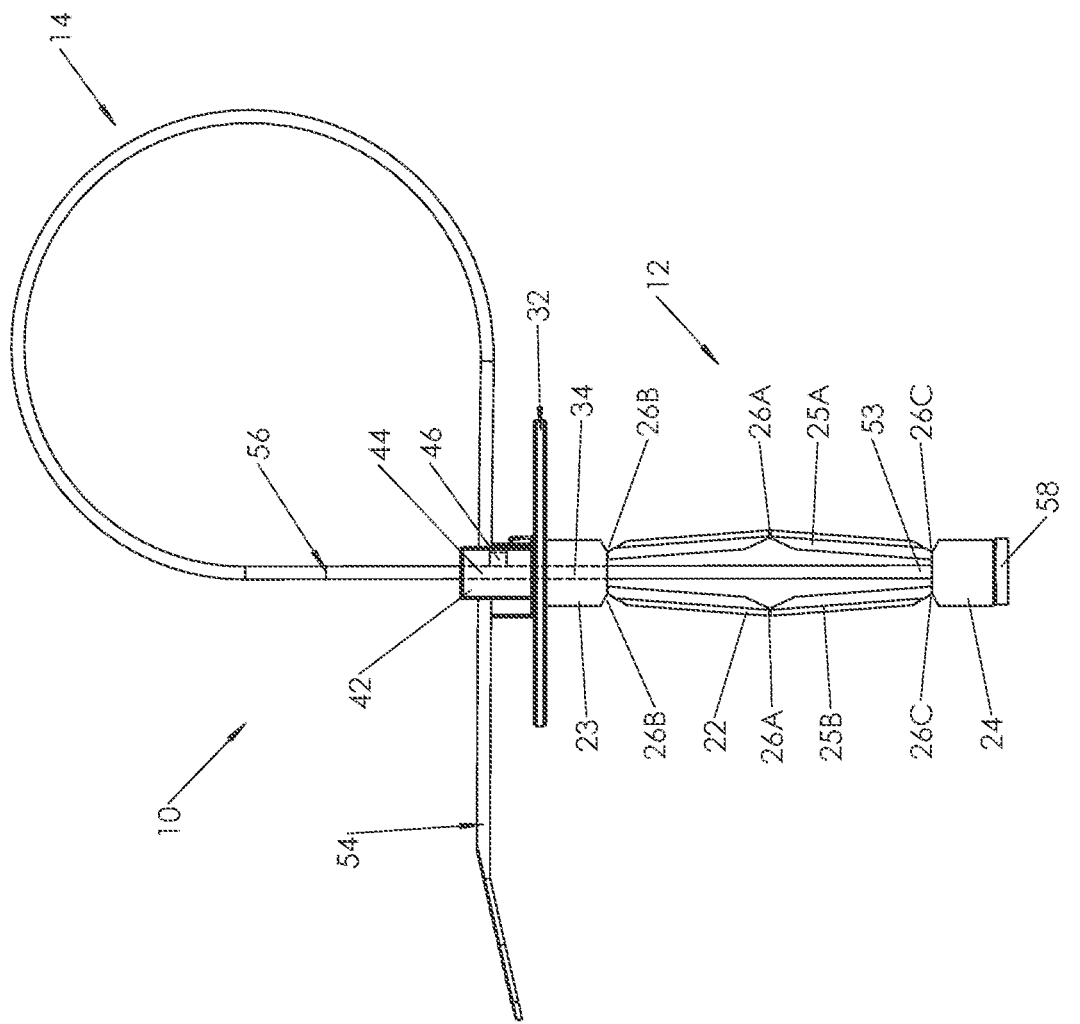
FIG. 1 is a side view of the anchor and strap combination.

Referring now to FIG. 1 by way of example, and not limitation, there is illustrated an example embodiment fastener, attachment, or affixing device, such as anchor 10. Preferably, anchor 10 includes a hinged member or expandable collar, such as fastener 12 integrated, formed or combined with a wire, zipper, rope, or line, such as strap 14. Fastener 12 preferably includes a hollow, tube shaped, flexible member, conduit or structure, such as barrel 22 having a rearward end, such as first barrel end and a forward end, such as second barrel end 24 and formed, cut or shaped approximately therebetween one or more cuts, tears, slots, slits or slatted sections that form, slatted section(s) 25 in barrel 22 and arranged approximately parallel linear axis of barrel 22. Preferably, slatted section(s) 25 (shown 25A and 25B) includes one or more collapsible or foldable sections, such as hinge member(s) 26 (shown 26A, 26B and 26C) configured to collapse or fold along approximate perpendicular axis to linear axis of barrel 22. It is contemplated herein that configurations other than barrel for fastener 12 may be utilized herein such as tube, cylinder, cube, angled, conduit or others known to one of ordinary skill in the art. It is contemplated herein that slatted section(s) 25 may be configured to collapse, bend or roll in an arc configuration rather than bend or hinge at one or more points. Moreover, barrel 22 preferably includes a washer, lip, overhang or projection, such as flange 32 positioned approximate one end of barrel 22, such as first barrel end 23 and preferably first barrel end 23 and flange 32 includes a passageway, such as flange hole 34. It is contemplated herein that flange 32 is preferably configured to set the depth barrel 22 of fastener 12 may be inserted into a hole or slot. It is further contemplated herein that flange 32 may be formed in a variety of shapes other than round, such as rectangular, square, angled, as a finger or the like. It is further contemplated herein that barrel 22, first barrel end 23, and second barrel end 24 may be formed in a variety of shapes other than round, such as rectangular, square, angled or the like to fit a similarly configured aperture, slot, rectangular, angled or square, or with a notch in first barrel end 23 or otherwise configured to insert and twist in hole H.

Furthermore, barrel 22 preferably includes a clasp, latch or cable tie, such as locking buckle 42 positioned approximate flange 32 or formed in combination with flange 32 and/or positioned approximate one end of barrel 22, such as first barrel end 23 (shown further in FIG. 5) or formed in combination with first barrel end 23. Moreover, locking buckle 42 preferably further includes a conduit, slot or passageway therethrough, such as channel 44 arranged approximately parallel linear axis of barrel 22 and having in combination a latch, lever, locking tang, such as pawl 46 (shown in FIG. 5) preferably located adjacent channel 44 of locking buckle 42.

Strap 14 preferably includes a bung, plug or cork, such as stopper 58 positioned on a first strap end 53 of strap 14 and one or more teeth, divots or rungs, such as cross-bars 56 are formed on strap 14 from approximately first end 53 to second strap end 54, and likely position crosswise on strap 14. It is contemplated herein that cross-bars 56 may be formed on one, more than one, or all sided of strap 14.

To assemble anchor 10 second strap end 54 of strap 14 is preferably inserted in second barrel end 24 of barrel 22 passing through barrel 22 and exiting barrel end 23 of barrel 22, and preferably passing through flange hole 34 of flange 32 and passing through channel 44 of locking buckle 42, wherein pawl 46 of locking buckle 42 engages cross-bars 56 formed on strap 14 until stopper 58 of strap 14 contacts second barrel end 24 of barrel 22, anchor 10 shown ready for use in FIG. 1.

It is contemplated herein that strap 14 and fastener 12 may be an integrated or formed as a unit or part or may be formed separately and assembled for use.

Anchor 10 is preferably formed, molded or configured from a suitable material, such as nylon, polypropylene, polyethylene, polystyrene, polyurethane, neoprene, or alternative resin or thermoplastic, plastic, cardboard, rubber, fiber, fiber reinforced, synthetic rubber, natural rubber, wood, metal, aluminum, alloy, stainless steel, shape memory metal, or any semi-flexible material or the like and any manufacturing method, capable of configuring or providing the structure of anchor 10. Preferably, the material includes other suitable characteristics, such as flexibility, strength, rigidity, durability, water-resistance, light weight, pliability, wearability, chemical inertness, oxidation resistance, safety, ease of workability, longevity, or other beneficial characteristic understood by one skilled in the art.

It is contemplated herein that strap 14 and fastener 12 may be an integrated or formed as a unit or may be formed separately and assembled for use.

It is contemplated herein that barrel 22, first barrel end 23 and second barrel end 24 may be formed in a variety of shapes other than round, such as rectangular or square to fit a slot or square hole H, or rectangular or square with a notch in first barrel end 23 or otherwise configured to insert and twist in hole H.

It is contemplated herein that locking buckle 42 herein may be integrated with flange 32 or positioned approximate flange 32.

It is contemplated herein that first barrel end 23 locking buckle 42 flange 32 herein may be integrated as a single unit.

Figure 5:
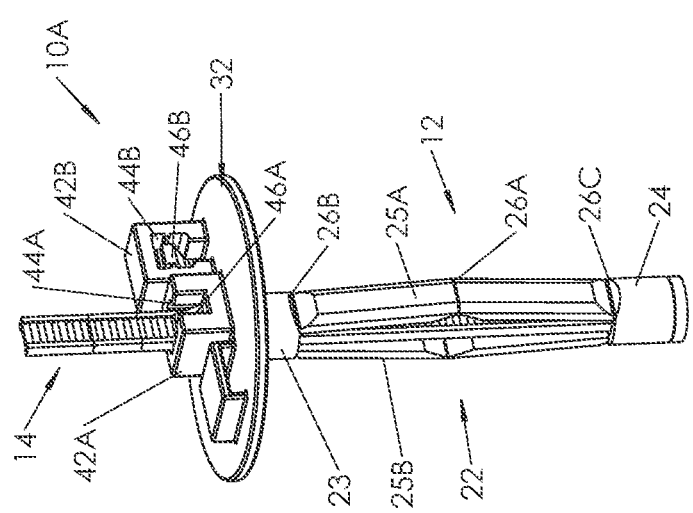
FIG. 5 is a perspective side view of an alternate example embodiment of an anchor and strap combination.

It is contemplated herein that fastener 12 and FIG. 5, including locking buckle 42A, locking buckle 42B, flange 32 and barrel 22 may be produced and sold separately (without strap 14 and stopper 58) to be utilized with any and all types of cable ties to form anchor 10.

Figure 2:
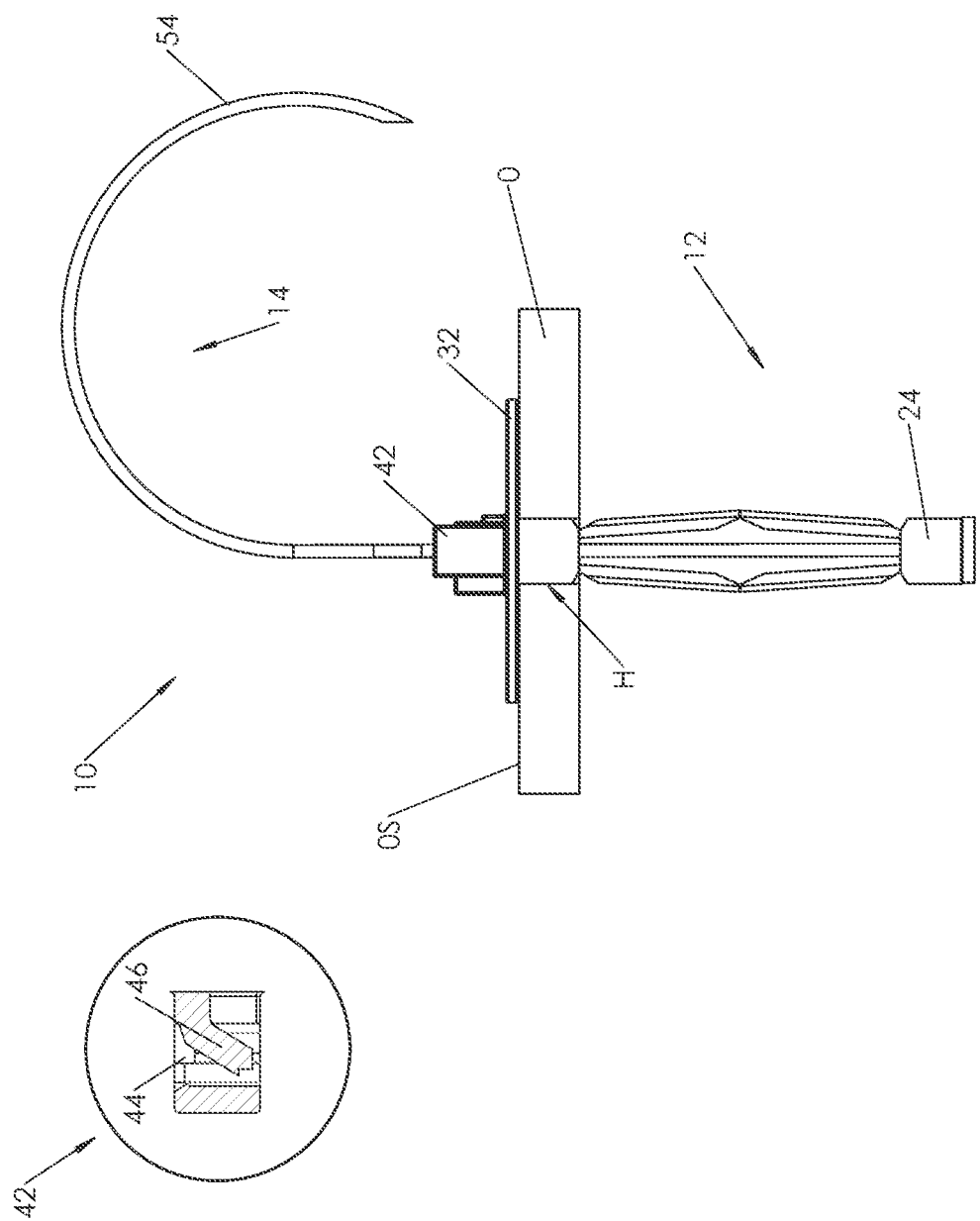
FIG. 2 is a side view of the anchor and strap combination of FIG. 1, shown inserted in a hole of an object.

Referring now to FIG. 2 by way of example, and not limitation, there is illustrated an example embodiment anchor 10 shown in use. Preferably, when anchor 10 is in use, second barrel end 24 of barrel 22 of fastener 12 is preferably inserted into the slot, blind hole or hole H of one or more adjacent or planar surface(s) or object(s) O until flange 32 seats against the hole's outer surface OS.

Referring again to FIG. 2 by way of example, and not limitation, there is illustrated an example cross section embodiment of locking buckle 42. Preferably, locking buckle 42 includes channel 44 configured to guide strap 14 through locking buckle 42, wherein pawl 46 of locking buckle 42 engages with, such as by ratcheting over, cross-bars 56 formed on strap 14 to prevent removal of strap 14 while cross-bars 56 are preferably being pulled through locking buckle 42 and to enable strap 14 to cinch stopper 58 and second barrel end 24 toward first barrel end 24, thus to compress one or more slatted sections 25 between first barrel end 23 and second barrel end 24.

It is contemplated that other engagement or securing configurations of locking buckle 42, channel 44 and pawl 46 are included herein. For example, the cable tie herein may also have a conventional release mechanism (not shown) provided in locking buckle 42 configured to enable pawl 46 to be disengaged from cross-bars 56 formed on strap 14, to allow the free end of strap 14 to be removed from locking buckle 42. Moreover, cable tie herein may also have a plurality of rungs disposed on the strap which engage with a worm gear mechanism (not shown), disposed within or on locking buckle 42 of the cable tie. Alternatively, cable tie herein may have a strap with a plurality of beads integrally formed along the strap, which engage with a tapered slot formed in locking buckle 42. As is apparent, the concept of the cable tie herein is utilizable with any and all types of cable ties.

It is contemplated herein that fastener 12, including locking buckle 42, flange 32 and barrel 22 may be produced and sold separately to be utilized with any and all types of cable ties to form anchor 10.

Figure 3:
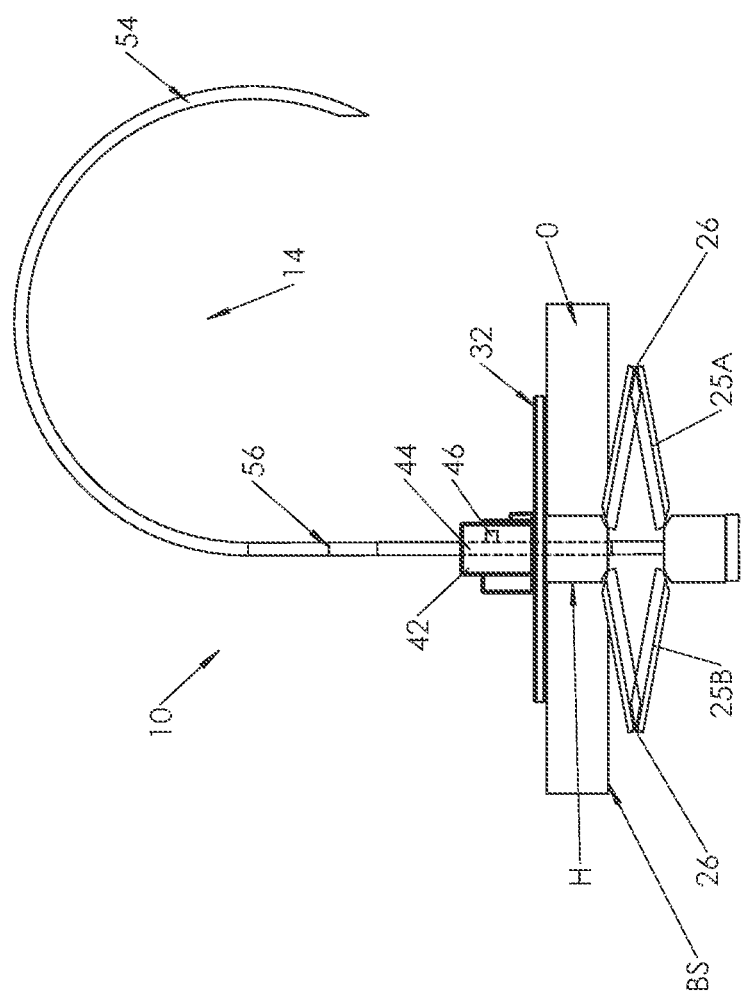
FIG. 3 is a side view of the anchor and strap combination of FIG. 1, shown anchored in a hole of an object.

Referring now to FIG. 3 by way of example, and not limitation, there is illustrated an example embodiment anchor 10 shown in use. While securing fastener 12 in such position, shown in FIG. 2, second strap end 54 of strap 14 is pulled through channel 44 of locking buckle 42, wherein pawl 46 of locking buckle 42 engages cross-bars 56 formed on strap 14 causing one or more slatted sections 25 of barrel 22 to bend, collapse expand, twist or mushroom out along hinge member(s) 26; thus compress one or more slatted sections 25 between first barrel end 23 and second barrel end 24 and to grip the hole or backside BS of object(s) O through hole H and further compressing or sandwiching object(s) O between slatted sections 25 and flange 32, and thus strap 14 locks in locking buckle 42 via pawl 46 to secure anchor 10 in object(s) O or to secure two or more object(s) O together.

It is contemplated herein that strap 14 may be trimmed flush with locking buckle 42 once anchored in hole H.

Figure 4:
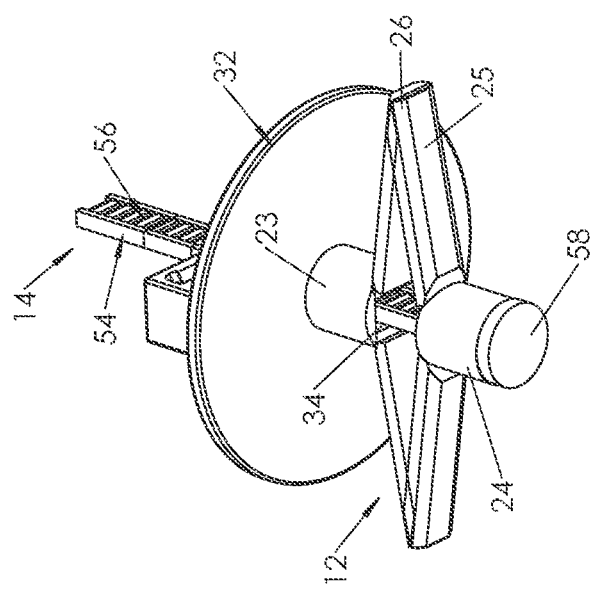
FIG. 4 is a bottom perspective view of the anchor and strap combination of FIG. 3, shown without the hole or an object.

Referring now to FIG. 4 by way of example, and not limitation, there is illustrated an example embodiment anchor 10 shown in use without the hole H or object O. When in use second strap end 54 of strap 14 is pulled through flange hole 34 of first barrel end 23 fastener 12, whereby fastener 12 is bent, squeezed, compacted or compressed along hinge member(s) 26 between first barrel end 23 and second barrel end 24 of barrel 22 causing one or more slatted sections 25 of barrel 22 to expand, twist or mushroom outward, preferably radially, from strap 14, thus, anchor 10 anchors, fastens or secures an object O (shown in FIG. 3) between flange 32 and slatted sections 25 of barrel 22.

Referring now to FIG. 5 by way of example, and not limitation, there is illustrated an example embodiment fastener, attachment, or affixing device, such as anchor 10A. Preferably, anchor 10A includes a pin, clip, or expandable collar, such as fastener 12 integrated, formed or combined with a wire, zipper, rope, or line, such as strap 14. Fastener 12 preferably includes a hollow, tube shaped, flexible, conduit or structure, such as barrel 22 having a rearward end, such as first barrel end 23 and a forward end, such as second barrel end 24 and formed, cut or shaped approximately therebetween one or more cuts, tears, slots, slits or slatted openings that form, slatted sections 25A and 25B in barrel 22 and arranged approximately parallel linear axis of barrel 22. Preferably, slatted section(s) 25 (shown 25A and 25B) includes one or more collapsible or foldable sections, such as hinge member(s) 26 (shown 26A, 26B and 26C) configured to collapse or fold along approximate perpendicular axis to linear axis of barrel 22. It is contemplated herein that configurations other than barrel for fastener 12 may be utilized herein such as tube, cylinder, cube, conduit or others known to one of ordinary skill in the art. It is contemplated herein that slatted section(s) 25 may be configured to bend or roll in an arc rather than bend or hinge at one or more points. Moreover, barrel 22 preferably includes a washer, lip, overhang or projection, such as flange 32 positioned approximate one end of barrel 22, such as first barrel end 23 and preferably first barrel end 23 and flange 32 includes a passageway, such as flange hole 34 (shown in FIG. 1). It is contemplated herein that flange 32 is preferably configured to set the depth barrel 22 of fastener 12 may be inserted into hole H (shown in FIG. 2). Furthermore, barrel 22 preferably includes a clasp, latch or cable tie, such as locking buckle 42A positioned approximate flange 32 or formed in combination with flange 32 and positioned approximate one end of barrel 22, such as first barrel end 23. Preferably, locking buckle 42A includes a combination latch, lever, locking tang, such as pawl 46 preferably located adjacent channel 44 of locking buckle 42A. Still further, barrel 22 or flange 32 preferably includes a clasp, latch or cable tie, such as locking buckle 42B positioned approximate flange 32 or barrel 22 or formed in combination with flange 32 or barrel 22 and positioned approximate one end of barrel 22, such as first barrel end 23. Preferably, locking buckle 42B further includes a conduit, slot or passageway therethrough, such as channel 44B arranged approximately perpendicular the linear axis of barrel 22 and having in combination a latch, lever, locking tang, such as pawl 46B preferably located within channel 44B and located adjacent channel 44B of locking buckle 42B.

It is contemplated herein that barrel 22, first barrel end 23 and second barrel end 24 may be formed in a variety of shapes other than round, such as rectangular or square to fit a slot or square hole H, or rectangular or square with a notch in first barrel end 23 or otherwise configured to insert and twist in hole H.

It is contemplated herein that fastener 12 and FIG. 5, including locking buckle 42A, locking buckle 42B, flange 32 and barrel 22 may be produced and sold separately (without strap 14 and stopper 58) to be utilized with any and all types of cable ties to form anchor 10.

Figure 6:
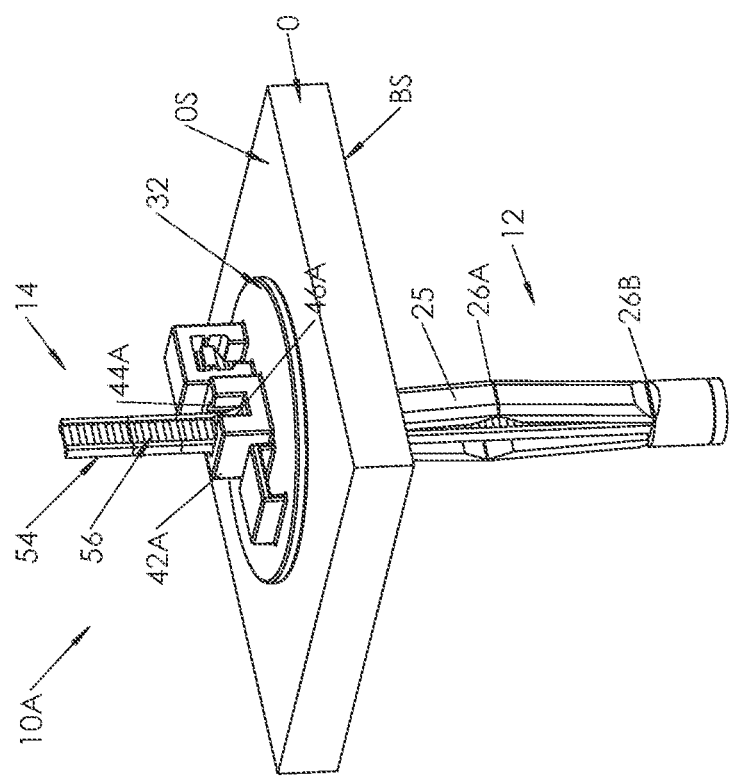
FIG. 6 is a perspective side view of an anchor and strap combination of FIG. 5, shown inserted in a hole of an object.

Referring now to FIG. 6 by way of example, and not limitation, there is illustrated an example embodiment anchor 10A shown in use. Anchor 10A when in use, barrel 22 of fastener 12 is preferably inserted into hole H of one or more adjacent or planar surface(s) or object(s) O until flange 32 seats against the hole's outer surface OS.

Figure 7:
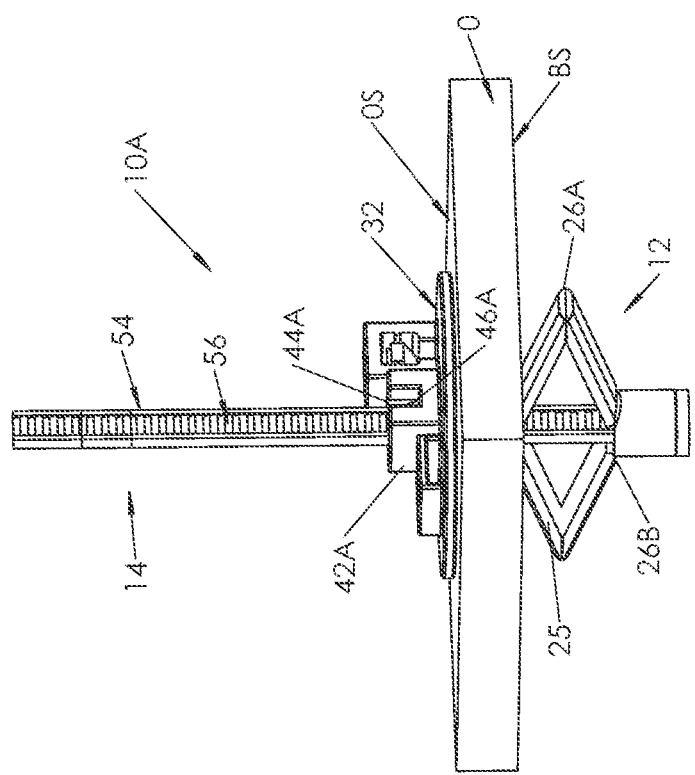
FIG. 7 is a perspective side view of the anchor and strap combination of FIG. 5, shown anchored in a hole of an object.

Referring now to FIG. 7 by way of example, and not limitation, there is illustrated an example embodiment anchor 10A shown in use. While securing fastener 12 in such position, shown in FIG. 6, second strap end 54 of strap 14 is pulled through channel 44A of locking buckle 42A, wherein pawl 46A of locking buckle 42A engages cross-bars 56 formed on strap 14 causing one or more slatted sections 25 of barrel 22 to expand, twist or mushroom out along hinge member(s) 26; thus gripping the hole or backside BS of object(s) O through hole H and compressing or sandwiching object(s) O between slatted sections 25 and flange 32, and thus strap 14 locks in locking buckle 42A to secure anchor 10 in object(s) O or to secure two or more object(s) O together.

Figure 8:
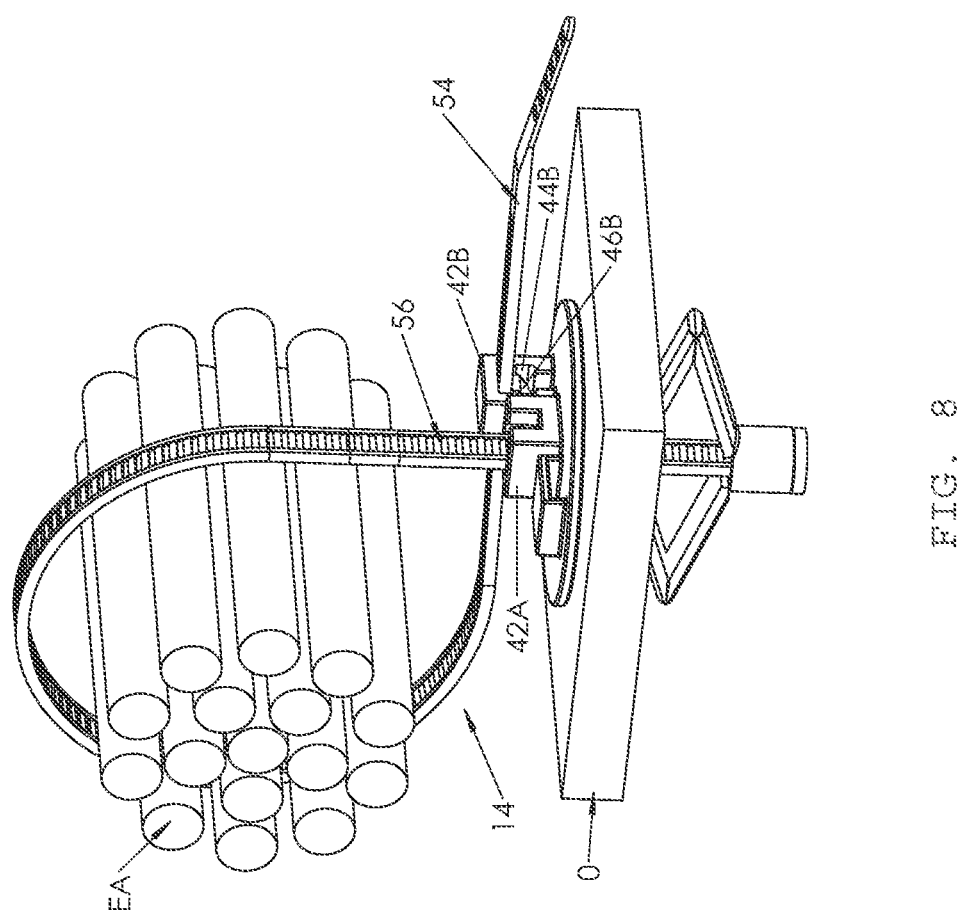
FIG. 8 is a perspective side view of the anchor and strap combination of FIG. 5, shown anchored in a hole of an object to secure one or more elongated member(s) therein.

Referring now to FIG. 8 by way of example, and not limitation, there is illustrated an example embodiment anchor 10A shown in use. After securing anchor 10A in such position, shown in FIG. 7 second strap end 54 of strap 14 is preferably further utilized to surround, cinch, wrap around or bundle one or more cable, rope, conduit, hose, wires, line chain or the like, such as elongated apparatus EA. Moreover, strap 14 is preferably inserted in locking buckle 42B pulled through channel 44B of locking buckle 42B, wherein pawl 46B of locking buckle 42B engages cross-bars 56 formed on strap 14 to secure elongated apparatus EA together and anchor elongated apparatus EA to object O. It is contemplated herein that two or more straps 14 may be utilized herein, such as, first strap 14A may be utilized to secure anchor 10 in object(s) O or to secure two or more object(s) O together and second strap 14B may be utilized to secure elongated apparatus EA together. Elongated apparatus EA preferably is a wire, cable, bundle or conduit but may include pipe, hose, rope or any other linear apparatus, or device and the like.

Figure 9:
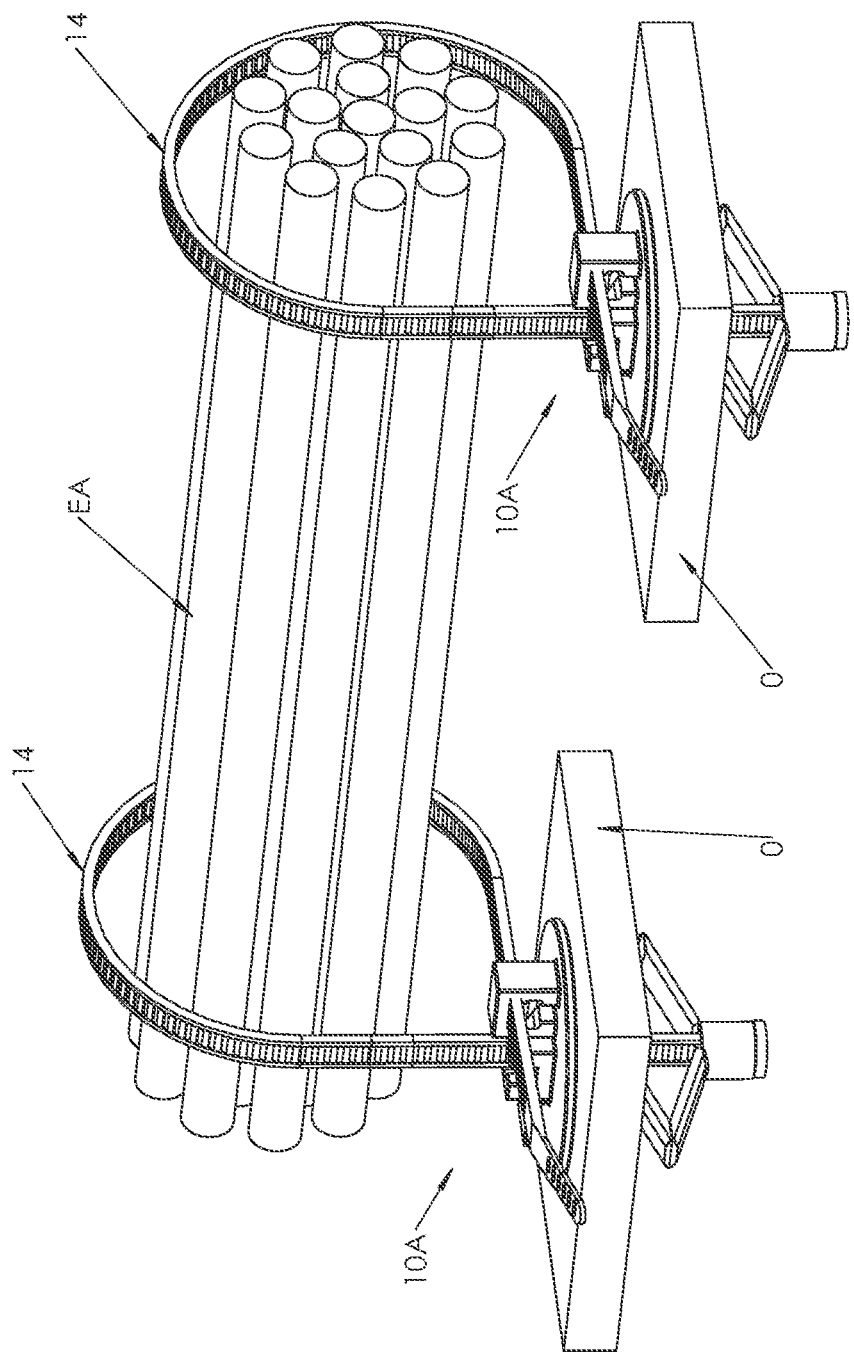
FIG. 9 is a perspective side view of one or more anchor and strap combinations of FIG. 5, shown each anchored in a hole of an object to secure one or more elongated member(s) along a run of the elongated member(s)

Referring now to FIG. 9 by way of example, and not limitation, there is illustrated an example embodiment anchor 10A shown in use wherein it is contemplated herein that one or more anchors 10A secured in object(s) O or to secure two or more object(s) O together may be utilized to support a run or length of elongated apparatus EA, shown in FIG. 8.

Figure 10:
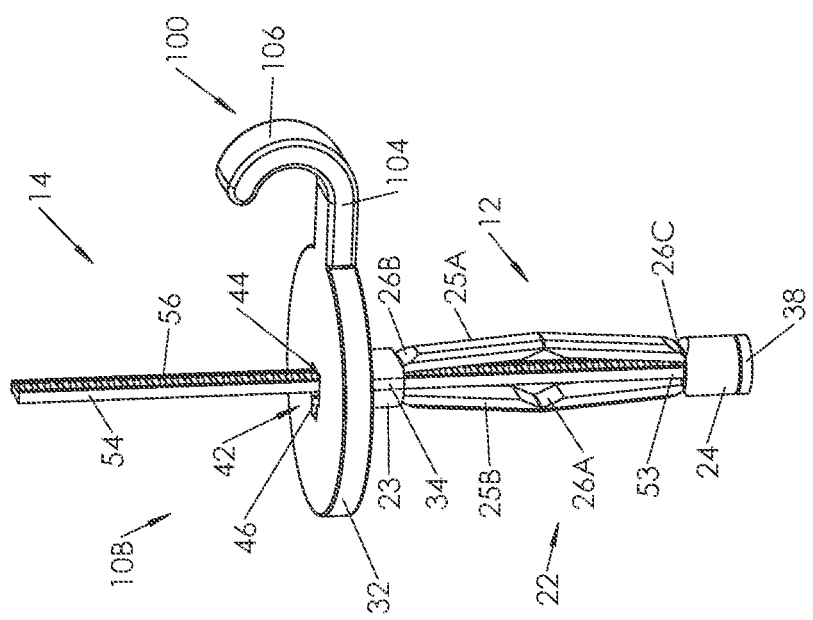
FIG. 10 is a perspective side view of an anchor and strap combination of FIG. 1 or FIG. 5 with an example attachment device.

Referring now to FIG. 10 by way of example, and not limitation, there is illustrated an example embodiment fastener, attachment, or affixing device, such as anchor 10B. Preferably, anchor 10B includes a hinged member or expandable collar, such as fastener 12 integrated, formed or combined with a wire, zipper, rope, or line, such as strap 14. Fastener 12 preferably includes a hollow, tube shaped, flexible member, conduit or structure, such as barrel 22 having a rearward end, such as first barrel end 23 and a forward end, such as second barrel end 24 and formed, cut or shaped approximately therebetween one or more cuts, tears, slots, slits or slatted sections that form, slatted section(s) 25 in barrel 22 and arranged approximately parallel linear axis of barrel 22. Preferably, slatted section(s) 25 (shown 25A and 25B) includes one or more collapsible or foldable sections, such as hinge member(s) 26 (shown 26A, 26B and 26C) configured to collapse or fold along approximate perpendicular axis to linear axis of barrel 22. It is contemplated herein that configurations other than barrel for fastener 12 may be utilized herein such as tube, cylinder, cube, angled, conduit or others known to one of ordinary skill in the art. It is contemplated herein that slatted section(s) 25 may be configured to collapse, bend or roll in an arc configuration rather than bend or hinge at one or more points. Moreover, barrel 22 preferably includes a washer, lip, overhang or projection, such as flange 32 positioned approximate one end of barrel 22, such as first barrel end 23 and preferably first barrel end 23 and flange 32 includes a passageway, such as flange hole 34. It is contemplated herein that flange 32 is preferably configured to set the depth barrel 22 of fastener 12 may be inserted into a hole or slot. It is further contemplated herein that flange 32 may be formed in a variety of shapes other than round, such as rectangular, square, angled, as a finger or the like. It is further contemplated herein that barrel 22, first barrel end 23, and second barrel end 24 may be formed in a variety of shapes other than round, such as rectangular, square, angled or the like to fit a similarly configured aperture, slot, rectangular, angled or square, or with a notch in first barrel end 23 or otherwise configured to insert and twist in hole H.

Furthermore, barrel 22 preferably includes a clasp, latch or cable tie, such as locking buckle 42 positioned approximate flange 32 or formed in combination with flange 32 and/or positioned approximate one end of barrel 22, such as first barrel end 23 (shown further in FIG. 5) or formed in combination with first barrel end 23. Moreover, locking buckle 42 preferably further includes a conduit, slot or passageway therethrough, such as channel 44 arranged approximately parallel linear axis of barrel 22 and having in combination a latch, lever, locking tang, such as pawl 46 (shown in FIG. 2,5) preferably located adjacent channel 44 of locking buckle 42.

Strap 14 preferably includes a bung, plug or cork, such as stopper 38 positioned on a first strap end 53 of strap 14 and one or more teeth, divots or rungs, such as cross-bars 56 are formed on strap 14 from approximately first end 53 to second strap end 54, and likely position crosswise on strap 14. It is contemplated herein that cross-bars 56 may be formed on one, more than one, or all sided of strap 14.

To assemble anchor 10B second strap end 54 of strap 14 is preferably inserted in second barrel end 24 of barrel 22 passing through barrel 22 and exiting first barrel end 23 of barrel 22, and preferably passing through flange hole 34 of first barrel end 23 and passing through channel 44 of locking buckle 42 of flange 32, wherein pawl 46 of locking buckle 42 engages cross-bars 56 formed on strap 14 until stopper 38 of strap 14 contacts second barrel end 24 of barrel 22, anchor 10B shown ready for use in FIG. 10.

It is contemplated herein that strap 14 and fastener 12 may be an integrated or formed as a unit or may be formed separately and assembled for use.

It is contemplated herein that barrel 22, first barrel end 23 and second barrel end 24 may be formed in a variety of shapes other than round, such as rectangular or square to fit a slot or square hole H, or rectangular or square with a notch in first barrel end 23 or otherwise configured to insert and twist in hole H.

It is contemplated herein that locking buckle 42 herein may be integrated with flange 32 or positioned approximate flange 32.

It is contemplated herein that first barrel end 23 locking buckle 42 flange 32 herein may be integrated as a single unit.

It is further contemplated herein that flange 32 or first barrel end 23 of barrel 22 or a combination thereof may include a hook, pegboard accessory, slotted board accessory, clasp, clip, catch, latch, loop, hanger, brackets, shelf or other accessory such as attachment device 100. It is further contemplated herein that attachment device 100 may include any attachment or affixing device known to one of ordinary skill in the art. Preferably attachment device 100 is formed in combination with flange 32 or barrel 22 and positioned approximate one end of barrel 22, such as first barrel end 23. Preferably, attachment device 100 further includes a support arm 104 and upturned arm 106.

It is contemplated herein that first barrel end 23 locking buckle 42 flange 32 herein may be integrated with attachment device 100.

It is contemplated herein that fastener 12 and FIG. 10, including locking buckle 42, flange 32 and barrel 22 may be produced and sold separately (without strap 14 and stopper 38) to be utilized with any and all types of cable ties to form anchor 10.

Figure 11:
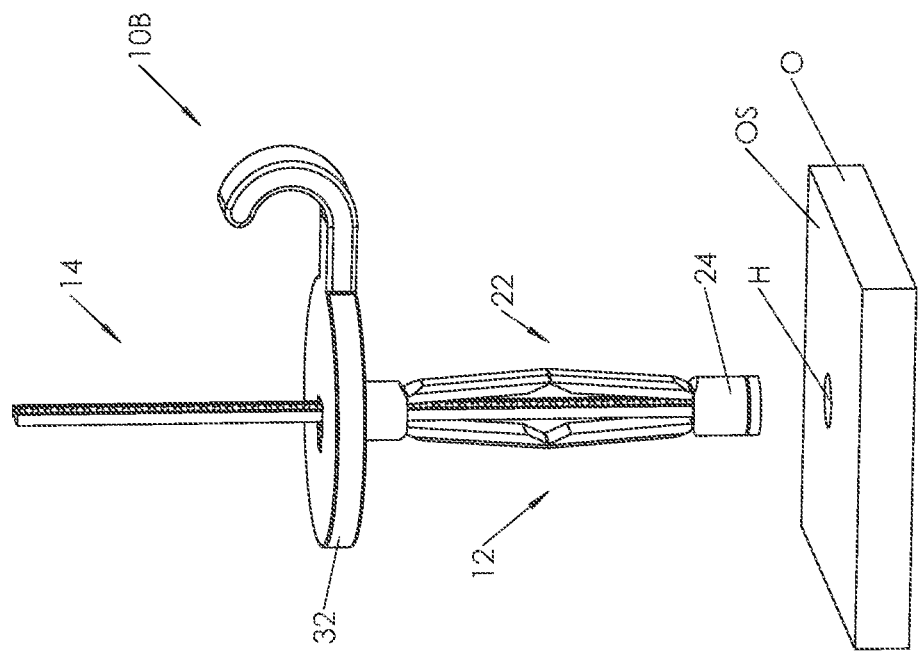
FIG. 11 is a perspective side view of the anchor and strap combination of FIG. 10, shown inserting in a hole of an object.

Referring now to FIG. 11 by way of example, and not limitation, there is illustrated an example embodiment anchor 10B shown in use. Preferably, when anchor 10B is in use, second barrel end 24 of barrel 22 of fastener 12 is preferably inserted into the slot, blind hole or hole H of one or more adjacent or planar surface(s) or object(s) O until flange 32 seats against the hole's outer surface OS.

It is contemplated herein that anchor 10B may include a variety of attachments similar to attachment device 100 to accommodate hanging or attaching any apparatus or device on attachment device 100 of anchor 10B, such as picture, tools, shelves, hangers, pegboard accessories, slotted pegboard accessories, organizers, cable or wires and the like.

It is contemplated herein that strap 14 may be trimmed flush with locking buckle 42 once anchored in hole H.

Figure 12:
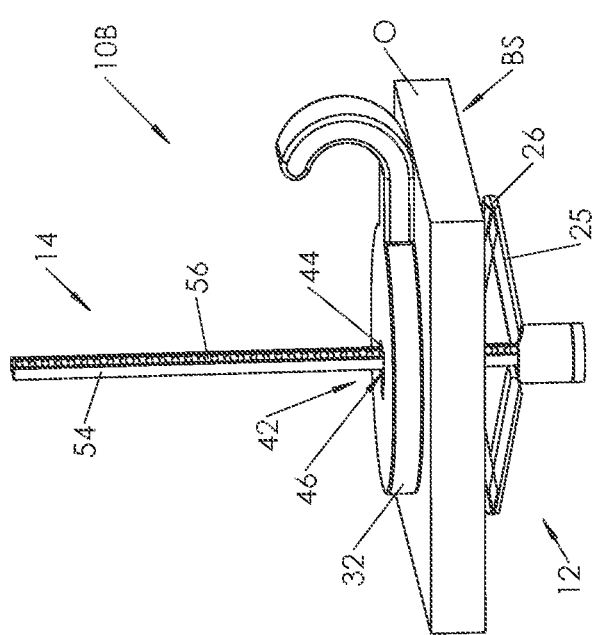
FIG. 12 is a perspective side view of an anchor and strap combination of FIG. 10, shown anchored in a hole of an object.

Referring now to FIG. 12 by way of example, and not limitation, there is illustrated an example embodiment anchor 10 shown in use. While securing fastener 12 in such position, shown in FIG. 12, second strap end 54 of strap 14 is pulled through channel 44 of locking buckle 42, wherein pawl 46 of locking buckle 42 engages cross-bars 56 formed on strap 14 causing one or more slatted sections 25 of barrel 22 to bend, collapse expand, twist or mushroom out along hinge member (s) 26; thus gripping the hole or backside BS of object(s) O through hole H and compressing or sandwiching object(s) O between slatted sections 25 and flange 32, and thus strap 14 locks in locking buckle 42 to secure anchor 10B in object(s) O or to secure two or more object(s) O together.

It is contemplated herein that the picture, tools, shelves, hangers, pegboard accessories, slotted pegboard accessories, organizers, cable or wires and the like may be affixed to attachment device 100 and secured in position by anchor 10B.

Figure 13:
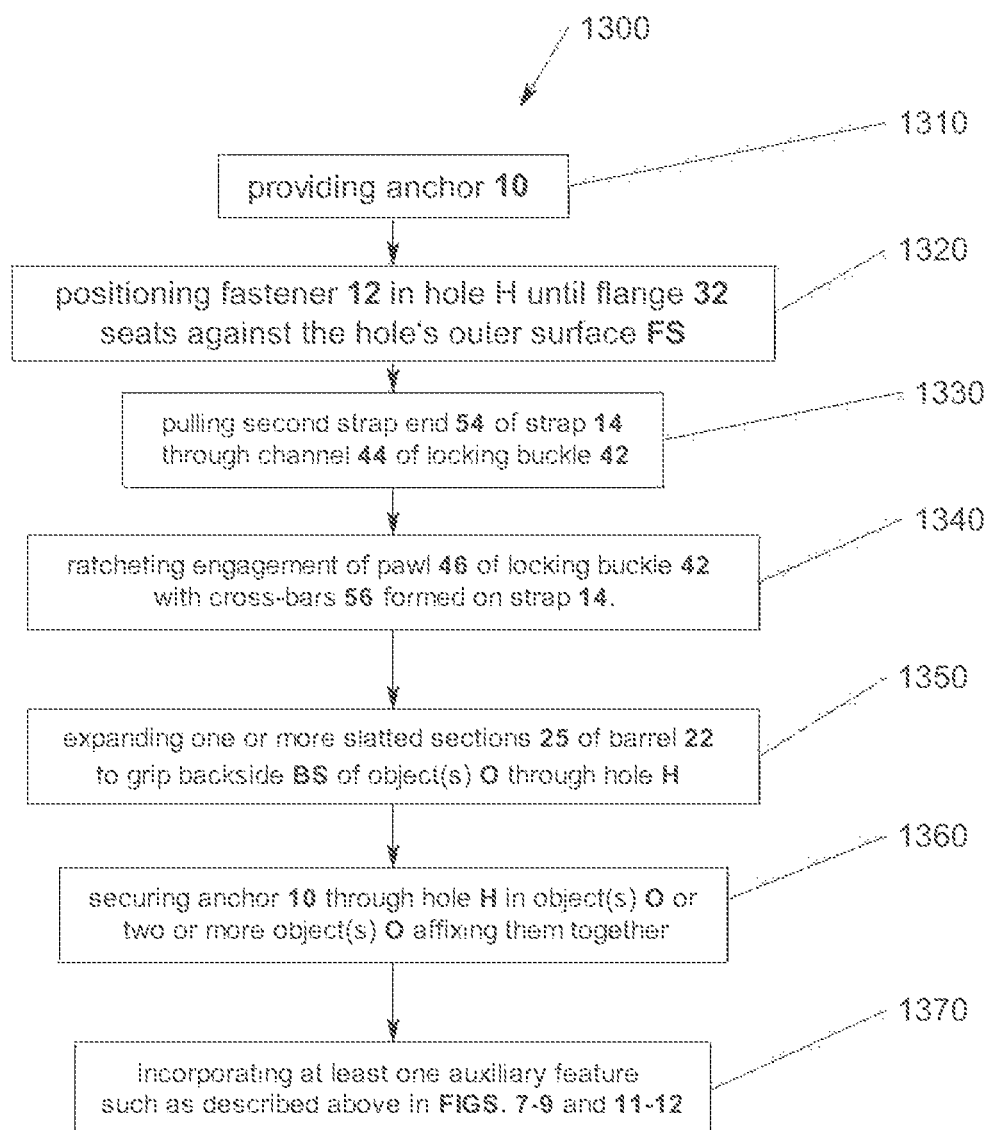
FIG. 13 is a flow diagram of a method of securing an anchor and strap combination of FIGS. 1-12 in a hole.

Referring now to FIG. 13, there is illustrated a flow diagram 1300 a method of securing an anchor in hole H. In block or step 1310, providing anchor 10 configured as a pin, clip, or expandable collar, such as fastener 12 integrated, formed or combined with a wire, zipper, rope, or line, such as strap 14, as described above in FIGS. 1-12. In block or step 1320, positioning fastener 12 in hole H until flange 32 seats against the hole's outer surface FS. In block or step 1330, pulling second strap end 54 of strap 14 through channel 44 of locking buckle 42. In block or step 1340, ratcheting engagement of pawl 46 of locking buckle 42 with cross-bars 56 formed on strap 14. In block or step 1350, expanding one or more slatted sections 25 of barrel 22 to grip backside BS of object(s) O through hole H. In block or step 1360, securing anchor 10 in object(s) O or two or more object(s) O together through hole H. In block or step 1370, incorporating at least one auxiliary feature such as described above in FIGS. 7-9 and 11-12.

The foregoing description and drawings comprise illustrative embodiments of the present invention. Having thus described exemplary embodiments, it should be noted by those ordinarily skilled in the art that the disclosures within are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one ordinarily skilled in the art to which this invention pertains, having the benefit of the teachings presented in the foregoing descriptions and the associated drawings. Although specific terms may be employed herein, they are used in a generic and descriptive sense only and not for purposes of limitation. Moreover, the present invention has been described in detail; it should be understood that various changes, substitutions and alterations can be made thereto without departing from the spirit and scope of the invention as defined by the appended claims. Accordingly, the present invention is not limited to the specific embodiments illustrated herein, but is limited only by the following claims.

Therefore, at least the following is claimed:

1. An anchor for insertion into an aperture of an object to anchor therein, said anchor comprising:
    a barrel, having a first barrel end and a second barrel end, formed with one or more slatted sections traverse approximately from said first barrel end to said second barrel end;
    a flange positioned approximate said first barrel end configured to set the depth said barrel inserted into the aperture, said first barrel end and said flange configured with a flange hole therethrough;
    at least one locking buckle positioned proximate said first barrel end and configured with a channel therethrough;
    a pawl positioned within said locking buckle adjacent said channel; and
    an elongated strap configured with a first strap end and a second strap end, said first strap end affixed to said second barrel end, said second strap end positioned through said flange hole, said channel, and said strap configured with one or more cross-bars formed on said strap.

2. The anchor of claim 1, wherein said strap configured to expand said one or more slatted sections when said second strap end traverses said channel.

3. The anchor of claim 2, wherein said locking pawl configured to engage said one or more cross-bars of said strap.

4. The anchor of claim 1, wherein said one or more slatted sections arranged approximately parallel a linear axis of said barrel.

5. The anchor of claim 4, wherein said one or more slatted sections configured to fold.

6. The anchor of claim 4, wherein said one or more slatted sections configured to fold approximate a perpendicular axis to said linear axis of said barrel.

7. The anchor of claim 1, wherein said one or more slatted sections configured to collapse and wherein said second barrel end is positioned proximate said first barrel end.

8. The anchor of claim 1, wherein said barrel configured as a tube.

9. The anchor of claim 1, wherein said one or more slatted sections configured as slits therein said barrel.

10. The anchor of claim 1, wherein said barrel configured to match the aperture.

11. The anchor of claim 1, wherein said first barrel end, said flange, and said at least one locking buckle configured as an integrated part.

12. The anchor of claim 1, wherein said stopper and said second barrel end configured as an integrated part.

13. The anchor of claim 1, wherein said flange and said at least one locking buckle configured as an integrated part.

14. The anchor of claim 1, further comprising an attachment device formed with said flange.

15. An anchor, for insertion into an aperture of an object to anchor therein, said anchor comprising:
    a barrel, having a first barrel end and a second barrel end, formed with one or more slatted sections traverse approximately from said first barrel end to said second barrel end;
    a flange positioned approximate said first barrel end configured to set the depth said barrel inserted into the aperture, said first barrel end and said flange configured with a flange hole therethrough;
    a first locking buckle positioned approximate said first barrel end and configured with a first buckle channel therethrough;
    a first buckle pawl positioned within said first locking buckle adjacent said first buckle channel;
    an elongated strap configured with a first strap end and a second strap end, said first strap end affixed to said second barrel end, said second strap end positioned through said flange hole, said first buckle channel, and said strap configured with one or more cross-bars formed on said strap;
    a second locking buckle positioned approximate said first barrel end and configured with a second buckle channel therethrough to receive said second strap end; and
    a second buckle pawl positioned within said second buckle adjacent said second buckle channel.

16. The anchor of claim 15, wherein said strap configured to expand said one or more slatted sections when said second strap end traverses said first buckle channel.

17. The anchor of claim 16, wherein said first locking pawl configured to engage said one or more cross-bars of said strap.

18. The anchor of claim 15, wherein said one or more slatted sections arranged approximately parallel a linear axis of said barrel.

19. The anchor of claim 18, wherein said one or more slatted sections configured to fold and wherein said second barrel end is positioned proximate said first barrel end.

20. The anchor of claim 18, wherein said one or more slatted sections configured to fold approximate a perpendicular axis to said linear axis of said barrel.

21. The anchor of claim 15, wherein said first buckle channel is positioned approximately perpendicular to said second buckle channel.

22. The anchor of claim 15, wherein said barrel configured as a tube.

23. The anchor of claim 15, wherein said one or more slatted sections configured as slits therein said barrel.

24. The anchor of claim 15, wherein said barrel configured to match the aperture.

25. The anchor of claim 15, wherein said first barrel end, said flange, said first locking buckle, and said second locking buckle configured as an integrated part.

26. The anchor of claim 15, wherein said second strap end and said second barrel end configured as an integrated part.

27. The anchor of claim 15, wherein said flange said first locking buckle, and said second locking buckle configured as an integrated part.

28. The anchor of claim 15, wherein said second strap end configured to encircle one or more elongated apparatus.

29. The anchor of claim 28, wherein said second strap end inserted through said second buckle channel of said second locking buckle.

30. The anchor of claim 29, wherein said second locking pawl configured to engage said one or more cross-bars of said strap to secure said one or more elongated apparatus.

31. The anchor of claim 1, further comprising an attachment device.

* * * * *